United States Patent
Nakahara et al.

(10) Patent No.: US 11,108,334 B2
(45) Date of Patent: Aug. 31, 2021

(54) POWER CONVERSION DEVICE

(71) Applicant: Hitachi Industrial Products, Ltd., Tokyo (JP)

(72) Inventors: Mizuki Nakahara, Tokyo (JP); Takae Shimada, Tokyo (JP); Kimihisa Furukawa, Tokyo (JP); Mitsuhiro Kadota, Tokyo (JP)

(73) Assignee: Hitachi Industrial Products, Ltd., Tokyo (JP)

( * ) Notice: Subject to any disclaimer, the term of this patent is extended or adjusted under 35 U.S.C. 154(b) by 0 days.

(21) Appl. No.: 16/770,894

(22) PCT Filed: Oct. 18, 2018

(86) PCT No.: PCT/JP2018/038880
§ 371 (c)(1),
(2) Date: Jun. 8, 2020

(87) PCT Pub. No.: WO2019/116722
PCT Pub. Date: Jun. 20, 2019

(65) Prior Publication Data
US 2021/0167690 A1 Jun. 3, 2021

(30) Foreign Application Priority Data

Dec. 12, 2017 (JP) .............................. JP2017-237767

(51) Int. Cl.
*H02M 5/458* (2006.01)
*H02M 7/217* (2006.01)
(Continued)

(52) U.S. Cl.
CPC ......... *H02M 3/33584* (2013.01); *H02M 1/08* (2013.01); *H02M 3/07* (2013.01);
(Continued)

(58) Field of Classification Search
CPC ..... H02M 5/458; H02M 5/4585; H02M 7/217
(Continued)

(56) References Cited

U.S. PATENT DOCUMENTS

2006/0233000 A1* 10/2006 Akagi .............. H02M 3/33584
363/37
2009/0237016 A1* 9/2009 Iwashita ................ H02J 7/345
318/400.3
(Continued)

FOREIGN PATENT DOCUMENTS

JP 2011-223735 A 11/2011
JP 2017-147812 A 8/2017
(Continued)

OTHER PUBLICATIONS

International Search Report (PCT/ISA/210) issued in PCT Application No. PCT/JP2018/038880 dated Jan. 15, 2019 with English translation (four (4) pages).
(Continued)

*Primary Examiner* — Gary A Nash
(74) *Attorney, Agent, or Firm* — Crowell & Moring LLP

(57) ABSTRACT

Provided is a power conversion device which can be configured inexpensively and in which initial charging can be performed quickly. Accordingly, the power conversion device is provided with: a power conversion device cell having a first converter for converting a first AC voltage to a first DC voltage, a second converter for converting the first DC voltage to another voltage, and a first capacitor charged by the first DC voltage; and a control circuit for allowing charging of the first capacitor while changing the operational state of the first converter in accordance with the first DC voltage.

5 Claims, 10 Drawing Sheets

(51) Int. Cl.
*H02M 3/335* (2006.01)
*H02M 1/08* (2006.01)
*H02M 3/07* (2006.01)
*H02M 7/12* (2006.01)
*H02M 7/48* (2007.01)
*H02M 1/00* (2006.01)

(52) U.S. Cl.
CPC .......... *H02M 7/12* (2013.01); *H02M 7/4826* (2013.01); *H02M 1/007* (2021.05); *H02M 1/0077* (2021.05); *H02M 5/458* (2013.01); *H02M 5/4585* (2013.01); *H02M 7/217* (2013.01)

(58) Field of Classification Search
USPC ................................. 363/34, 35, 37, 78, 84
See application file for complete search history.

(56) References Cited

U.S. PATENT DOCUMENTS

| | | | | |
|---|---|---|---|---|
| 2013/0258725 | A1* | 10/2013 | Colombi | H02M 7/219 363/37 |
| 2014/0062354 | A1* | 3/2014 | Choi | H02P 27/00 318/400.3 |
| 2015/0236603 | A1* | 8/2015 | Jimichi | H02M 7/49 363/37 |
| 2015/0311814 | A1* | 10/2015 | Stolt | H02M 5/4585 363/37 |
| 2016/0226427 | A1* | 8/2016 | Sakai | H02P 27/08 |

FOREIGN PATENT DOCUMENTS

| | | |
|---|---|---|
| WO | WO 2005/020420 A1 | 3/2005 |
| WO | WO 2017/163508 A1 | 9/2017 |

OTHER PUBLICATIONS

Japanese-language Written Opinion (PCT/ISA/237) issued in PCT Application No. PCT/JP2018/038880 dated Jan. 15, 2019 (five (5) pages).

Rodriguez et al., "Multilevel Inverters: A Survey of Topologies, Controls, and Applications", IEEE Transactions of Industrial Electronics, Aug. 2002, pp. 724-738, vol. 49, No. 4 (15 pages).

* cited by examiner

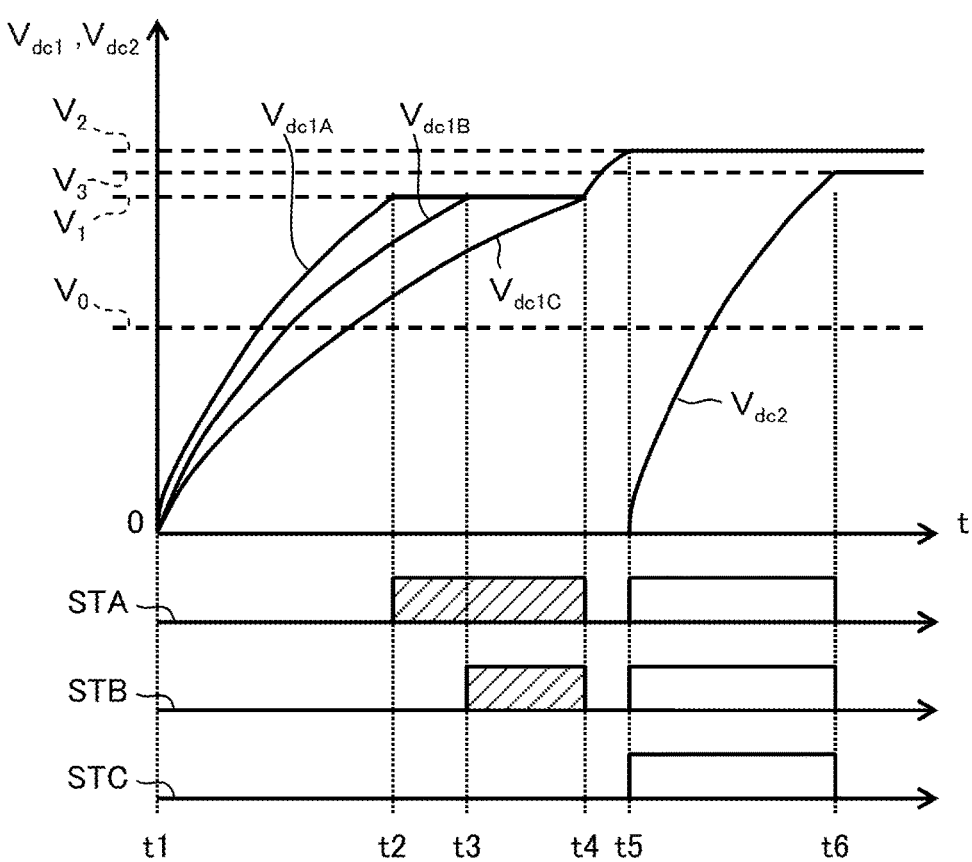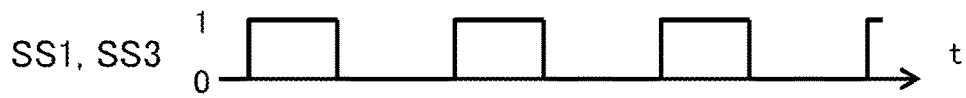

POWER CONVERSION DEVICE

TECHNICAL FIELD

The present invention relates to a power conversion device.

BACKGROUND ART

Conventionally, power conversion devices are known, each of which includes a plurality of power converter cells (hereinafter called cells) connected in series to receive and outputs a high voltage with linkage with an AC system or a DC system (for example, see Non-patent literature 1). Generally, in such a kind of the power conversion devices, each of the cells includes a converter, a rectifying circuit such as a diode-bridge, and, as a rear stage of them, a smoothing capacitor for smoothing the DC voltage. In a startup operation of the power conversion device, when linkage is made with the AC system or the DC system in a state that the capacitors of each of the cells has not been charged, a rash current flows into the capacitors through the rectifying circuit, which may damage diodes and the capacitors. A patent literature 1 below disclosed, as a counter measure, a configuration in which a startup operation, the smoothing capacitor is charged in advance and after the capacitor has been sufficiently charged, linkage is made.

PRIOR ART

Patent Literature

PATENT DOCUMENT 1: JP2011-223735A

Non-Patent Document

Non-patent literature 1: J. Rodriguez, J. S. Lai, and F. Z. Peng "Multilevel inverters: a survey of topologies, controls, and applications", IEEE Trans. Ind. Electron., Vol. 49, No. 4, pp. 724-738 (2002 August) Non-patent literature 1; J. Rodriguez, J. S. Lai, and F. Z. Peng, "Multilevel inverters: a survey of topologies, controls, and applications", IEEE Trans. Ind. Electron., Vol. 49, No. 4, pp. 724-738 (2002 August).

SUMMARY OF INVENTION

Problem to be Solved by Invention

However, according to the technology described in Patent literature 1, there is a problem that it takes long time to complete initial charging since the capacitors at each cell should be charged sequentially one by one. Further, there is another problem in that the cost becomes high since a circuit scale of the power supply circuit, etc. for initial charging becomes large.

The present invention is developed in consideration of these problems and aims to provide a power conversion device capable of rapid initial charging at low cost.

Means for Solving Problem

To solve the problem, there is provided a power conversion device comprising: a power converter cell including:
a first converter configured to convert a first AC voltage into a first DC voltage;
a second converter configured to convert the first DC voltage into another voltage; and
a first capacitor charged using the first DC voltage; and
a control circuit configured to effect, while changing the operation state of the first converter in accordance with the first DC voltage, charging the first capacitor.

Advantageous Effect of Invention

An aspect of the present invention provides a power conversion device capable of rapid initial charging at a low cost.

BRIEF DESCRIPTION OF DRAWINGS

FIGS. 6A to 6D are waveform charts of a former stage DC link voltages and a rear stage DC link voltages.

FIGS. 7A to 7D are waveform charts of drive signals supplied to a full bridge circuit.

MODES FOR CARRYING OUT INVENTION

First Embodiment

<Configuration of a First Embodiment>

Figure 1:
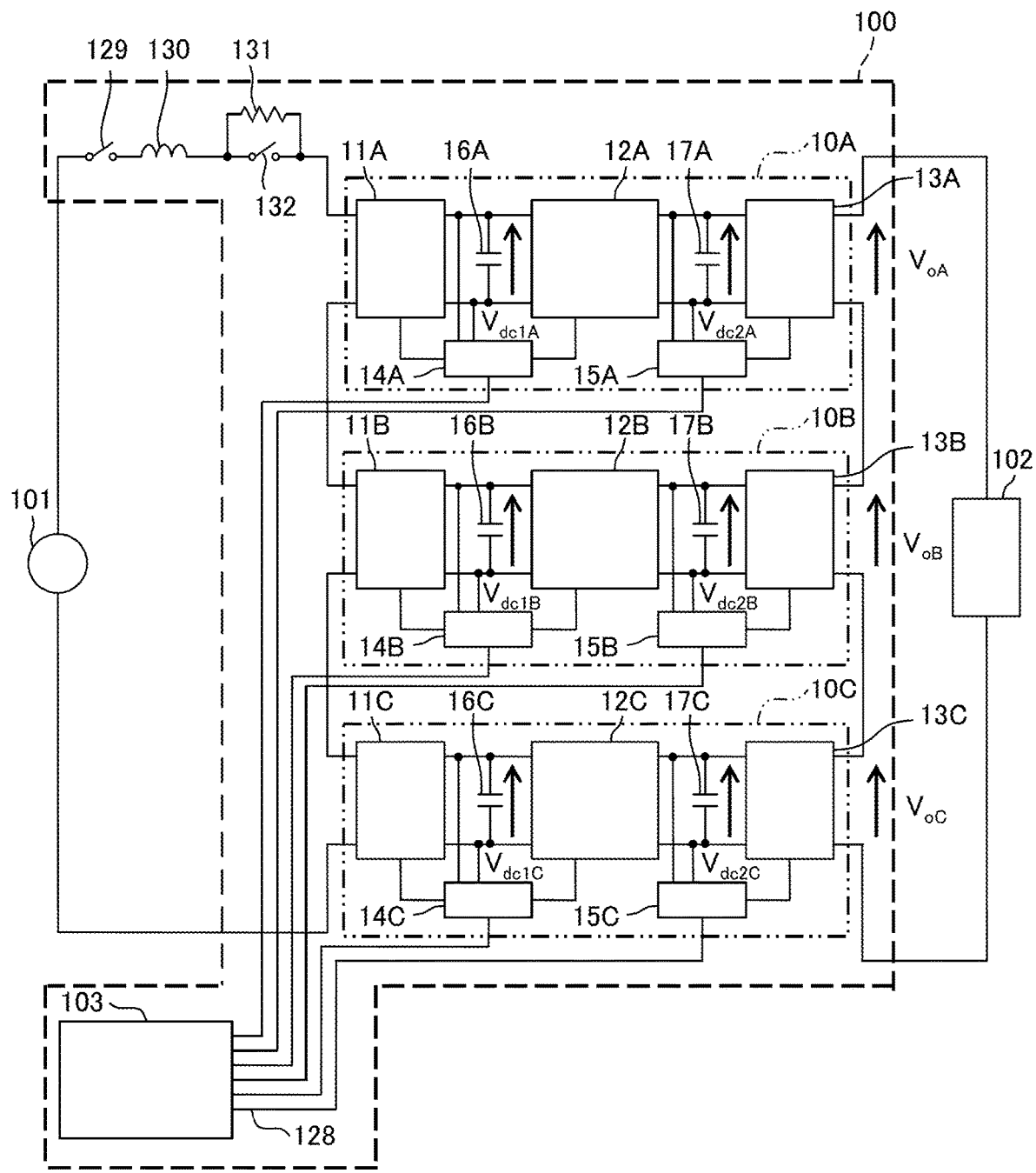
FIG. 1 is a block diagram of a power conversion device according to a first embodiment of the present invention.

FIG. 1 is a block diagram of a power conversion device 100 according to a first embodiment.

The power conversion device 100 converts a power inputted from a grid power source 101 to output a power to an external load device 102. The 100 includes switches 129, 132, a reactor 130, an initial charging resistor 131, three power converter cells 10A, 10B, 10C, and a central control circuit 103 (control circuit).

The power converter cells 10A, 10B, 10C include converters 11A, 11B, 11C (first converters), DC/DC converters 12A, 12B, and 12C (second converters), inverters 13A, 13B, 13C, former stage cell control circuits 14A, 14B, 14C, rear stage cell control circuits 15A, 15B, 15C, former stage DC link capacitors 16A, 16B, and 16C (first capacitors), and rear stage DC link capacitors 17A, 17B, and 17C (second capacitors), respectively. Hereinbelow, the power conversion cells 10A, 10B, 10C may be generally called as "power converter cell 10". Similarly, internal configurations of the power converter cell 10 may be called as "converter 11", "DC/DC converter 12", "inverters 13", "former stage cell control circuit 14", "rear stage control circuit 15", "former stage DC link capacitor 16", and "rear stage DC link capacitor 17".

The converters 11A, 11B, and 11C generate by converting the AC voltage from the system power source 101 into former stage DC link voltages $V_{dc1A}$, $V_{dc1B}$, $V_{dc1C}$ (first DC voltages are, hereinbelow, generally called as former stage DC link Voltages $V_{dc1}$), respectively. The DC/DC converters 12A, 12B, 12C convert the former DC link voltages to generate rear stage DC link voltage $V_{dc2A}$, $V_{dc2B}$, $V_{dc2C}$ (second DC voltages, hereinbelow may generally call them rear stage DC link voltage $V_{dc2}$) which are insulated from the former stage DC link voltage, respectively.

The inverters 13A, 13B, 13C converters convert the rear stage DC link voltages into AC voltages $V_{oA}$, $V_{oB}$, and $V_{oC}$ as outputs, respectively.

The former stage cell control circuit 14 controls the converter 11, the DC/DC converter 12. The rear stage cell control circuit 15 controls the inverters 13. The former stage cell control circuits 14 operates using the former DC link voltages $V_{dc1}$ as a voltage source thereof, and the cell control circuit 15 operates using the rear stage DC link voltage $V_{dc2}$ as a voltage source thereof. The former DC link capacitor 16 is connected in parallel to an output side DC part of the converter 11 and an input side DC part of the DC/DC converter 12. Further, the rear stage DC link capacitor 17 is connected in parallel to an output side DC part of the DC/DC converter 12 and an input side DC part of the inverter 13.

The central control circuit 103, the former cell control circuit 14, and the rear stage cell control circuit 15 include hardware for a general computer such as a CPU, (Central processing Unit), a RAM (Random Access Memory), a ROM (Read Only Memory), etc. The ROM stores control programs executed by the CPU and various kind of data, etc. The central control circuit 13 is connected to the former stage cell control circuit 14 and the rear stage cell control circuit 15 of each of the power converter cells 10 through communication lines 128 to control operation of each of the converters 11, each of the DC/DC converters 12, and each of the inverters 13. Further, a communication means for the central control circuit 103 and each of the power converter cells may be a wireless communication.

The switch 129, the reactor 130, and a parallel circuit including the initial charging resistor 131 and switches 129 is connected in series to input terminals of the power converter cells 10A, 10B, and 10C, respectively. Accordingly, the input terminals of the converters 11 included in the power converter cell 10 are connected to the switch 129, the reactor 130, and the parallel circuit in series. Further output terminals of each of the power converter cells 10 are connected in series, so that a total of the output voltages of these power converter cells is an output voltage of the power conversion device 100.

Figure 2:
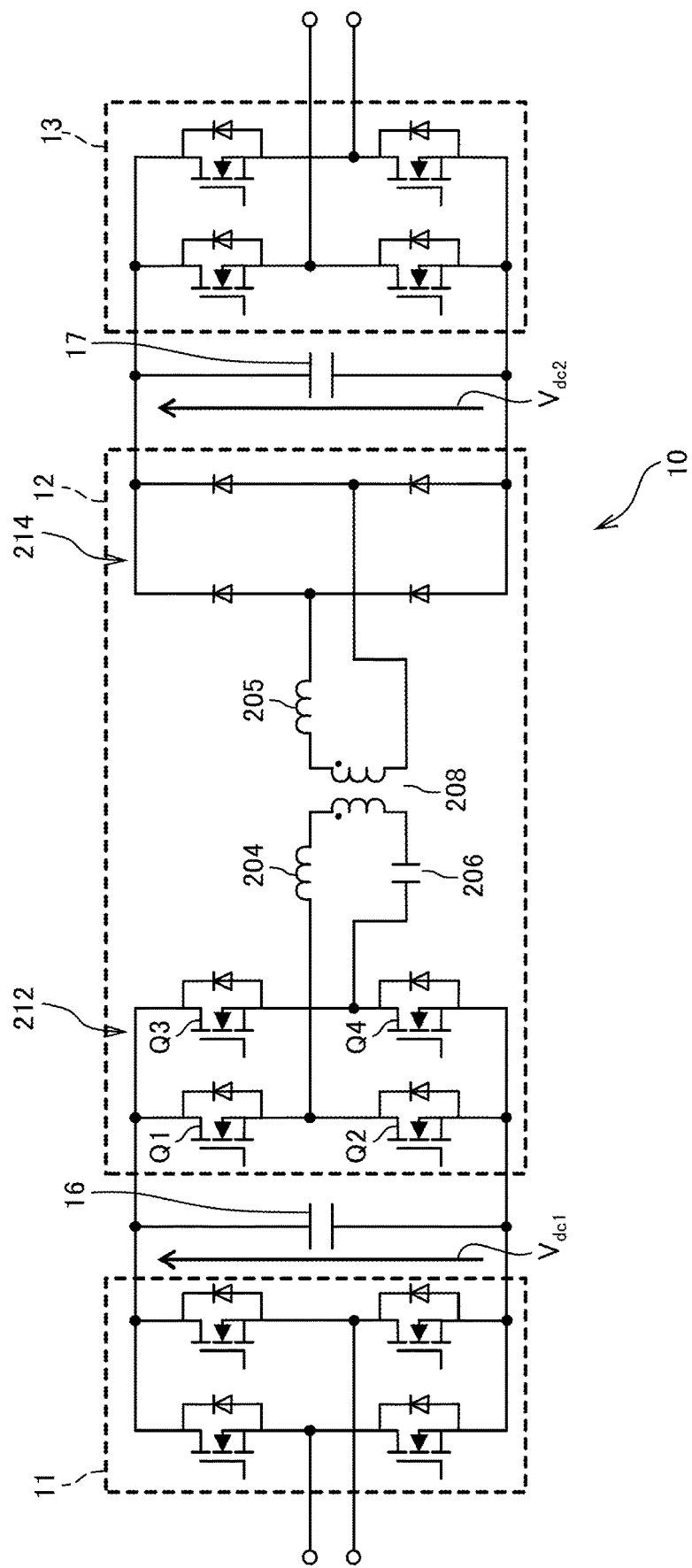
FIG. 2 is a schematic circuit diagram of a main part of a power converter cell.

FIG. 2 is a schematic circuit diagram of a main part of the power converter cell 10 (mainly a power system is shown).

The converter 11 includes elements (without reference numerals) having a full bridge connection to convert the AC voltage inputted externally into a DC voltage. Further, in the example as shown, the switching elements are MOSFET (Metal-Oxide-Semiconductor Field-Effect Transistor). The DC voltage is smoothed by the former stage DC link capacitor 16 connected to the rear stage and supplied to the DC/DC converter 12 provided at a further rear stage. The DC/DC converter 12 includes a full bridge circuit 212 including switching elements Q1 to Q4, resonation inductors 204, 205, a resonation capacitor 206, a transformer 208, and a diode bridge circuit 214.

The full bridge circuit 212 converts the DC voltage of the former stage DC link capacitor 16 into a high frequency AC voltage to supply a power to a secondary side of the transformer 208 through a primary side of the transformer 208. The high frequency AC voltage induced on the secondary side of the transformer 208 is converted into a DC voltage by the diode bridge circuit 214. The converted DC voltage is smoothed by the rear stage DC link capacitor 17, and the power is supplied to the inverter 13 connected thereto at a rear stage thereof. A current outputted by the full bridge circuit 12 causes current resonation by the resonation inductors 204, 205, and the resonation capacitor 206. The current resonation can make cutoff currents upon turnoff of the switch elements Q1 to Q4 small, so that a conversion efficiency of the DC/DC converter 12 can be increased.

Figure 3:
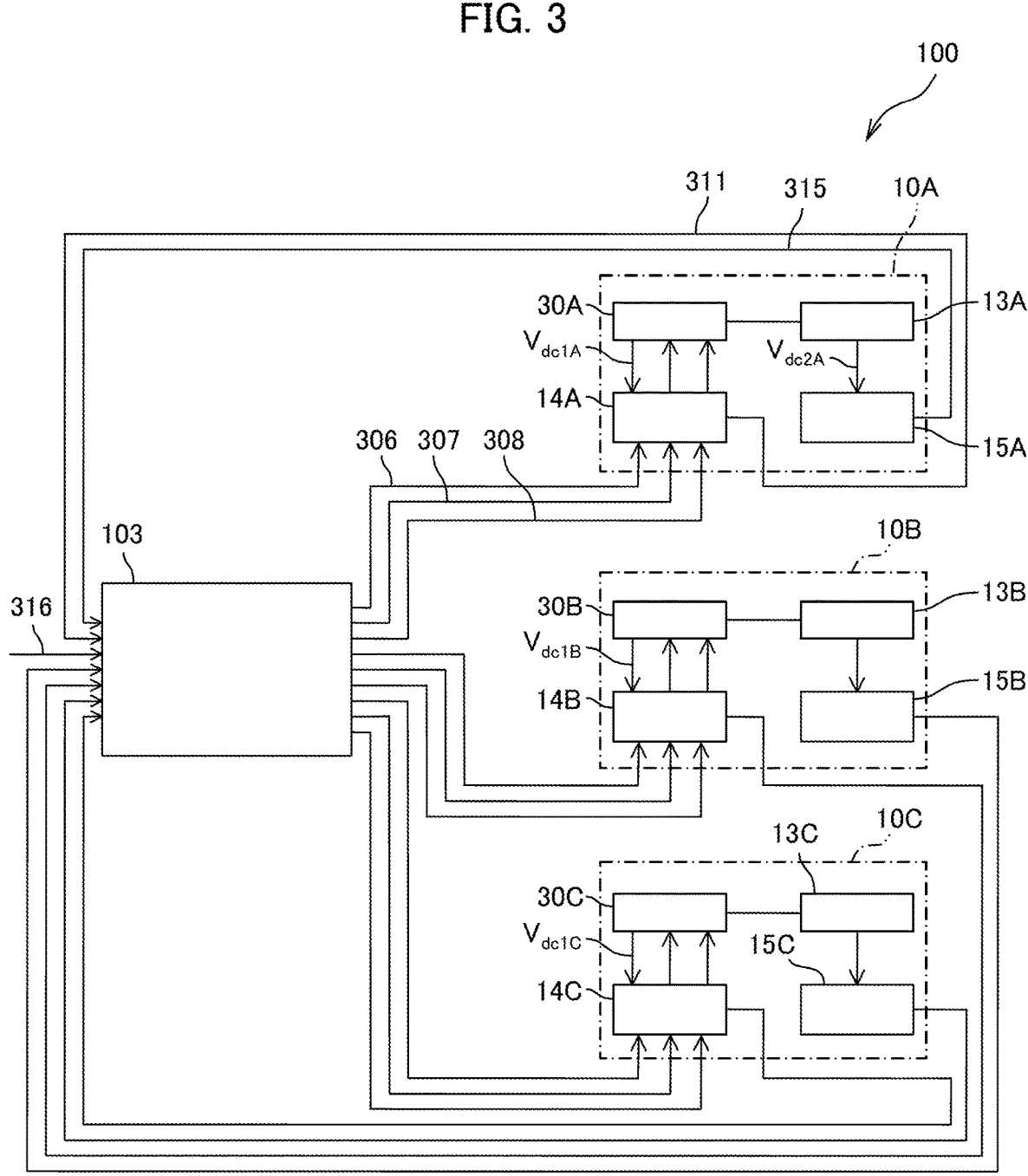
FIG. 3 is a block diagram of a main part of the power conversion device.

FIG. 3 is a block diagram of a main part (mainly the control system is shown) of the power conversion device 100.

In FIG. 3, parts, each including the converter 11, the former stage DC link capacitor 16, the DC/DC converter 12, and the rear stage DC link capacitor 17 in FIG. 1 are shown in FIG. 3 as AC/DC converters 30A, 30B, 30C, respectively (hereinafter, these may be generally called AC/DC converters 30).

In other words, each of the power converter cells 10 includes the AC/DC converter 30, and the inverter 13, the former stage control circuit 14, and the rear stage cell control circuit 15.

The former stage cell control circuit 14 receives a former stage DC link Voltage $V_{dc1}$ from the AC/DC converter 30 and outputs the result to the central control circuit 103 as a former stage DC link voltage notice signal 311. Further, the rear stage cell control circuit 15 receives a rear stage DC link voltage $V_{dc2}$ from the inverter 13 and outputs the result to the central control circuit 103. The central control circuit 103 transmits, based on a former stage link voltage notice signal 311 and a rear stage DC link voltage notice signal 315, a former stage link voltage command value 306, a rear stage DC link voltage command value 307, and an operation command 308 to the former stage cell control circuit 14.

Further, the former stage cell control circuit 14 generates a gate signal based on the former stage DC link voltage command value 306 supplied from the central control circuit 103 to drive an AC/DC converter 30.

Further, the central control circuit 103 starts a predetermined initial charging operation in response to input of a startup command 316 from outside.

<Operation of First Embodiment>
(Outline of Operation)

Next, an operation of the embodiment will be described. In the first embodiment, first, the startup command 316 (see FIG. 3) is supplied to the central control circuit 103. In response to this, the central control circuit 103 closes the switch 129 (see FIG. 1) and opens the switch 132. Then, a current flow from the system power source 101 through the initial charging resistor 131 and the converters 11A, 11B, and 11C.

In FIG. 2, at this instance, all of the switching elements belonging to the converter 11 are in OFF states. Then, the converter 11 functions as a full wave rectifying circuit including four circulation diodes (without reference numerals). Accordingly, when an AC voltage is applied to the input terminal of the converter 11, the AC voltage is rectified, so that charging the former stage DC link capacitor 16 is started using the rectified DC voltage.

In each of the power converter cell 10, when the corresponding former stage DC link voltage $V_{dc1}$ increases to a predetermined control circuit startup voltage $V_0$ (see FIG. 6), the former stage cell control circuit 14 starts up. Further, the former cell control circuit 14 starts monitoring the former stage DC link voltage $V_{dc1}$ using the corresponding former stage DC link voltage $V_{dc1}$ as a power source voltage. Further more, the central control circuit 103 transmits to each of the former cell control circuits 14 an operation command instructing to set an operation mode to "Initial charging mode MD1".

In the initial charging mode MD1, each of the former stage cell control circuits 14 sets a target value of the former stage DC link voltage $V_{dc1}$ to a predetermined voltage $V_1$ (see FIG. 6). More specifically, the former stage cell control circuit 14 starts comparing the former DC link voltage $V_{dc1}$ with a predetermined voltage $V_1$. Here, when electrostatic capacities of the former DC link capacitors 16A, 16B, and 16C are C A, C B, C C, these electrostatic capacities are generally different from each other due to dispersion in manufacturing, aged deterioration, etc. When the electrostatic capacities are $C_A<C_B<C_C$, a terminal voltage of the former state DC link capacitor 16, i.e., the former stage DC link voltage $V_{dc1A}$ reaches the predetermined voltage $V_1$ first.

When the former stage DC link voltage $V_{dc1}$ reaches the predetermined voltage $V_1$ in each of the power converter cell 10, the former stage cell control circuit 14 starts operation of the DC/DC converter 12 and controls and output power of the DC/DC converter 12 to keep the former stage DC link voltage $V_{dc1}$ at the predetermined voltage $V_1$ (i.e., so that the former stage DC link voltage $V_{dc1}$ approaches the predetermined voltage $V_1$). dc1 This prevents the former stage DC link voltage $V_{dc1}$ from over voltage.

After that, also in the power converter cells 10B, 10C, the former DC link voltage $V_{dc1}$ successively reaches the predetermined voltage $V_1$. As described above, in all of the power converter cells 10A, 10B, 10C, when the former stage DC link voltage $V_{dc1}$ reaches the predetermined voltage $V_1$, the central control circuit 103 transmits to all the former stage cell control circuits 14 an operation command to set the operation mode to the "initial charging mode MD2. In the initial charging mode MD2, the central control circuit 103 closes the switch 132. Further, in the initial charging mode MD2, the former stage cell control circuit 14 stops operation of the DC/DC converter 12 while operating the converter 11, and sets a target value of the former DC link voltage $V_{dc1}$ to a second predetermined voltage V2 (see FIG. 6).

Here, the predetermined voltage $V_1$ is such a voltage that no rash current to the former DC link capacitor 16 occurs, though the switch 132 is closed. For example, there may be a method to determine the voltage substantially equal to the maximum value of the AC voltage of the system power source 101. As described above, the former stage DC link voltage $V_{dc1}$ in each of the power converter cells 10 is boosted.

Shortly, in all of the power converter cells 10, when the former stage DC link voltage $V_{dc1}$ is boosted to the predetermined voltage V2, the initial charging of the former stage DC link capacitor 16 in each of the power converter cells has completed. Here, it is preferable that the predetermined voltage V2 has such a value equal to the former stage DC link voltage $V_{dc1}$ in a normal operation.

As described above, when the initial charging of the former stage DC link capacitors 16 has completed, the central control circuit 103 sets the operation mode of the all of the former stage cell control circuits 14 to "Initial charging mode MD3". The initial charging mode MD3 is an operation mode in which the rear stage DC link capacitor 17 in each of the power converter cells 10 is initially charged.

The former stage cell control circuit 14 of each of the power converter cells sets a command value of the rear stage DC link voltage $V_{dc2}$ to a predetermined voltage $V_3$ (see FIG. 6) and operates the DC/DC converter 12. Accordingly, the rear stage DC link voltage $V_{dc2}$ of each of the power converter cells is boosted to the predetermined voltage $V_3$, so that the rear stage DC link capacitor 17 is charged. Here, it can be controlled to make a value of the current flowing through the rear stage DC link capacitor 17 less than a predetermined value to prevent the rush current from flowing into the rear stage DC link capacitor 17. After the current control, it is preferable to control the rear stage DC link voltage $V_{dc2}$ to approach the predetermined voltage $V_3$.

When the rear stage DC link voltage $V_{dc2}$ of each of the power converter cells reaches the predetermined voltage $V_3$, the initial charging operations to the former DC link capacitor 16 and the rear stage DC link capacitor 17 have completed. Next, the central control circuit 103 transmits to each of the former stage control circuit 14 an operation command to set the operation mode to "normal operation mode MD4". Accordingly, each of the power converter cells 10 starts the normal operation. More specifically, the AC electric power inputted from the system power source is converted into an AC power having a different voltage amplitude and a different frequency supplied to the load device 102.

(Operation of Central Control Circuit 103)

Figure 4:
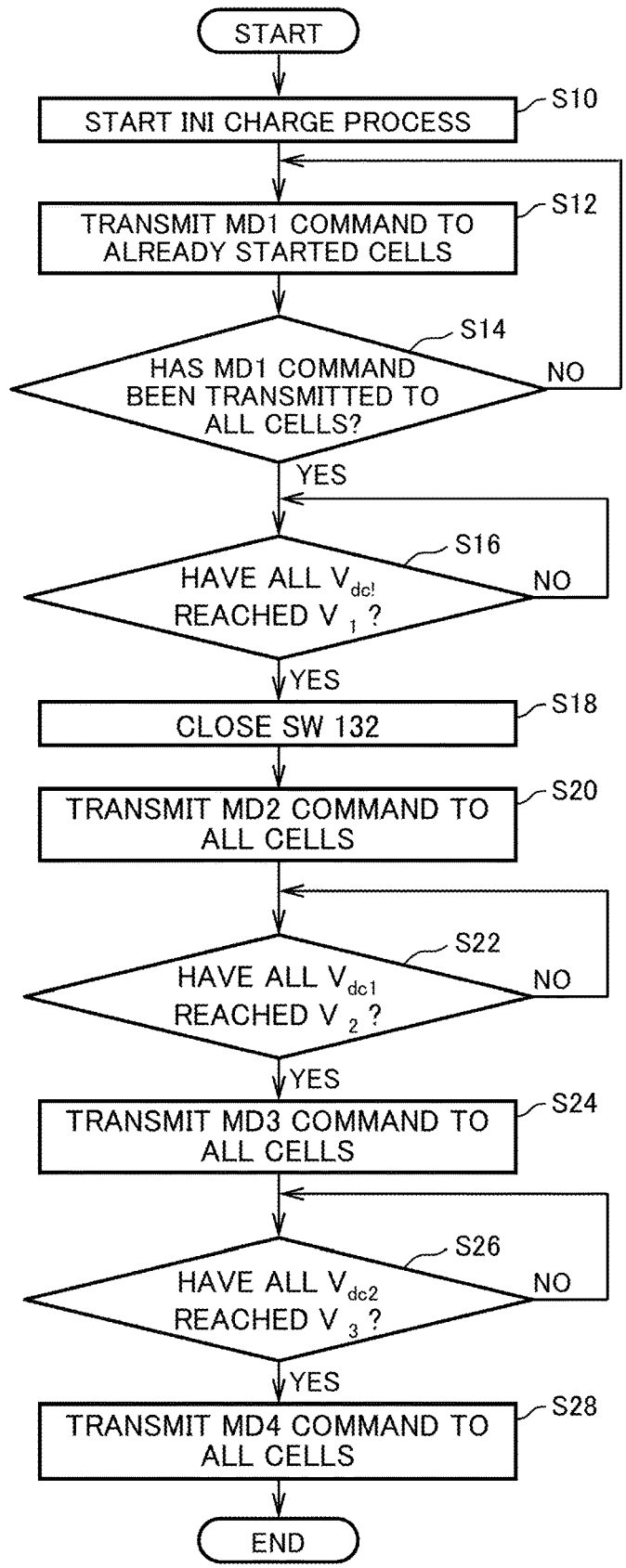
FIG. 4 is a flow chart of a control program executed by a central control circuit.

FIG. 4 is a flow chart of a control program executed by the central control circuit 103 for the sequential initial charging.

In FIG. 4, the processing starts. When the processing proceeds to a step S10, the initial charging starting process is executed. More specifically, the central control circuit 103 closes the switch 129 and opens the switch 132. After this, in the former stage cell control circuits 14, when occurrence of "one of the cells which has "started-up"", the former stage cell control circuit 14 in the cell transmits information specifying the cell to the central control circuit 103. Here, "the cell which has "started-up" is the cell whose former DC link voltage $V_{dc1}$ reaches the control circuit start up voltage $V_0$.

Next, when the processing proceeds to a step S12, the central control circuit 103 transmits to cells having completed start-up operation out of the power converter cells 10 an operation command to set the operation mode to the initial charging mode MD1, i.e., "MD1 command".

Next, when the processing proceeds to a step S14, it is judged whether the MD1 command has been transmitted to all of the power converter cells 10 or not. When it is judged as "No", the processing returns to the step S12 and a loop of the step S12 and S14 is repeated until the MD1 command has transmitted to all of the power converter cells. At the step S14, when it is judged as "Yes", the processing proceeds to a step S16.

At the step S16, it is judged whether all of the former stage DC link voltages $V_{dc1}$ of the power converter cells 10 have reached to the predetermined voltage $V_1$ or not. When it is judged as "No", the processing executes waiting. When all of the former stage DC link voltages $V_{dc1}$ reach the predetermined voltage $V_1$, it is judged as "Yes", and the processing proceeds to a step S18.

At a step S18, the central control circuit 103 closes the switch 132 (see FIG. 1).

Next, when the processing proceeds to a step S20, the central control circuit 103 transmits an operation command to set the operation mode to an initial charging mode MD2, i.e., "MD2 command" to all of the power converter cells 10.

Next, when the processing proceeds to a step S22, the central control circuit 103 judges whether the former stage DC link voltages $V_{dc1}$ reach a predetermined voltage $V_2$ in all of the power converter cells 10. When it is judged as "No", the processing waits at the step S22. On the other hand, when the former stage DC link voltages $V_{dc1}$ of all of the power converter cells reach the predetermined voltage $V_2$, it is judged as "Yes" and the processing proceeds to a step S24.

In the processing at the step S24, the central control circuit 103 transmits an operation command to set the operation mode to the initial charging mode MD3, i.e., "MD3 command", to all of the power converter cell 10.

Next, when the processing proceeds to a step S26, the central control circuit 103 judges whether the rear stage DC link voltages $V_{dc2}$ have reached the predetermined voltage $V_3$ or not in all of the power converter cells 10. When it is judged as "No", the processing executes waiting at the step S26. On the other hand, when the rear stage DC link voltages $V_{dc2}$ of all of the power converter cells 10 reach the predetermined voltage V3, it is judged as "Yes", and the processing proceeds to a step S28.

Next, when the processing proceeds to a step S28, the central control circuit 103 transmits an operation command to set the operation mode to the normal operation mode MD4, i.e., "MD4 command" to all of the power converter cells 10.

Accordingly, the operation modes in all of the power converter cells 10 are set to the normal operation mode MD4. In other words, each of the power converter cells 10A, 10B, and 10C start the normal operations, and the processing of this main routine finishes.

(Operation of Former Stage Cell Control Circuit 14)

Figure 5:
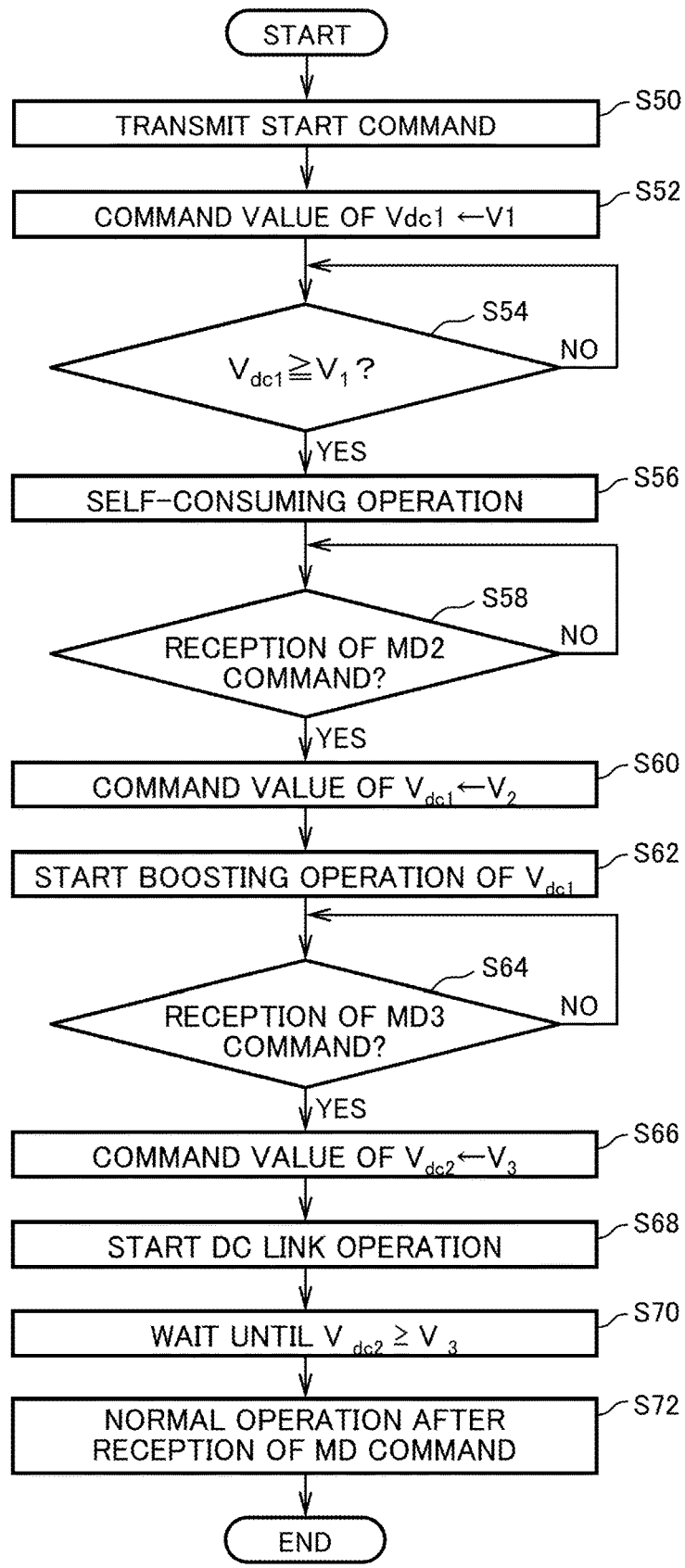
FIG. 5 is a flow chart of a control program executed by a former stage cell control circuit.

FIG. 5 is a flow chart of the control program executed by the former stage cell control circuit 14 when the initial charging is made.

As described above, the former stage cell control circuit 14 is in a non-startup state until the former stage DC link voltage $V_{dc1}$ reaches a control circuit start up voltage $V_0$. When the former stage DC link voltage $V_{dc1}$ reaches the control circuit status voltage $V_0$, the former stage cell control circuit 14 starts up, and the processing proceeds to a step S50 in FIG. 5. Here, the former stage cell control circuit 14 transmits a notice indicative of completion of startup of the former stage control circuit, i.e., a startup notice to the central control circuit 103.

Next, when the processing proceeds to a step S52, the former stage control circuit 14 sets a command value of the former stage DC link voltage $V_{dc1}$ to the predetermined voltage $V_1$ and starts monitoring the former stage DC link voltage $V_{dc1}$. Next, when the processing proceeds to a step S54, the former stage cell control circuit 14 determines whether the former stage DC link voltage $V_{dc1}$ reaches the predetermined voltage $V_1$ or not, i.e., determines whether a relationship "$V_{dc1} \geq V_1$" establishes. When it is judged as "No", the processing executes waiting at the step S54. On the other hand, when the relationship "$V_{dc1} \geq V_1$" establishes, it is judged as "Yes", and the processing proceeds to a step S56.

At the step S56, "Self-consuming operation" is started. Though the Self-consuming operation" will be described in detail later, this is for maintaining the former DC link voltage $V_{dc2}$ to the predetermined voltage $V_1$ by consuming a slight power by the full bridge circuit 212 through switching operation of t the switching elements Q1 to Q4 between ON and OFF stage in the full bridge circuit 212 (see FIG. 2), i.e., an operation to make the $V_{dc1}$ closer to the predetermined voltage $V_1$. Next, when the processing proceeds to a step S58, the former stage cell control circuit 14 determines whether the MD2 command has been received from the central control circuit 103. When it is judged as "No", the processing is waiting at the step S58. On the other hand, when the MD2 command has been received, it is judged as "Yes", the processing proceeds to a step S60.

At a step S60, the former stage cell control circuit 14 sets the command value of the former stage DC link voltage $_{dc1}$ to the predetermined voltage $V_2$. Next, when the processing proceeds to a step S62, the former stage cell control circuit 14 starts a $V_{dc1}$ boosting operation to boost the former stage DC link voltage $V_{dc1}$. Here, "$V_{DC1}$ boosting operation" means both startup of the converter 11 and stopping the DC/DC converter 12. Then, the former stage cell control circuit 14 starts controlling the converter 11 to equalize the former DC link voltage $V_{dc1}$ to the predetermined voltage $V_2$.

Next, when the processing proceeds to a step S64, the former stage cell control circuit 14 determines whether the MD3 command has been received from the central control circuit 103 or not. When it is determined as "No", the processing are waiting at the step S64. On the other hand, when the MD3 command is received, it is determined as "Yes", the processing proceeds to a step S66. At this step, the former stage cell control circuit 14 sets a command value of the rear stage DC link voltage $V_{dc2}$ to a predetermined voltage $V_3$. Next, when the processing proceeds to a step S68, the former stage cell control circuit 14 starts a DC link operation. The "DC link operation" is an operation to startup the DC/DC converter 12 to transmit a DC power to the rear stage DC link capacitor 17 from the DC/DC converter 12. When the DC power is transmitted, charging the rear stage DC link capacitor 17 is started, so that the rear stage DC link voltage $V_{dc2}$ is increasing.

Next, when the processing proceeds to a step S70, the former cell control circuit 14 waits until the rear stage DC link voltage $V_{dc2}$ reaches the predetermined voltage $V_3$, i.e., a relationship $V_{dc2} \geq V_3$ has established. When the relationship of "$V_{dc2} \geq V3$" has established, the processing proceeds to a step S72. At the step, in the former stage cell control circuit 14, the processing waits until an MD4 command, i.e., an operation command to set the operation mode to the normal operation mode MD4, has received. When the MD4 command from the central control circuit 103 is received, the former stage cell control circuit 14 sets the operation mode to the normal operation mode MD4 and finish the processing of the routine.

(Example of Waveform)

FIG. 6 is a waveform chart of the former stage DC link voltage $V_{dc1}$ and the rear stage DC link voltage $V_{dc2}$ in the embodiment.

In FIG. 6, it is assumed that at time t1, the initial charging starting process (S10 in FIG. 4) is executed in the central control circuit 103. As described above, assuming the electrostatic capacitances of the former stage DC link capacitors 16A, 16B, and 16C are $C_A$, $C_B$, and $C_C$, and the electrostatic capacitance magnitude relation is $C_A < C_B < C_C$, out of the former stage DC link voltages $V_{dc1A}$, $V_{dc1B}$, and $V_{dc1C}$, the former stage DC link voltage $V_{dc1A}$ reaches the predetermined voltage $V_1$ first. The time is assumed as t2.

After this, it is assumed that the former stage DC link voltage $V_{dc1B}$ reaches the predetermined voltage $V_1$, and at time t4, the former stage DC link voltage $V_{dc1C}$ reaches the predetermined voltage $V_1$. At time t4, since the former stage DC link voltages $V_{dc1}$ of all of the power converter cells 10 have reached to the predetermined voltage $V_1$, the central control circuit 103 closes the switch 132 (see FIG. 1)(steps S16, S18 in FIG. 4) and transmits the MD2 command (S20 in FIG. 4). It is assumed that this operation increases the former stage DC link voltage $V_{dc1}$ in each of the power converter cells 10A, 10B, and 10C, and at time t5, all of the former stage DC link voltages $V_{dc1}$ are boosted to the predetermined voltage $V_2$.

Next, the central control circuit 10 transmits the "MD3 command" (S22, S24 in FIG. 4). When receiving the M3 command, the former stage cell control circuit 14 sets a command value of the rear stage DC link voltage $V_{dc2}$ to the predetermined voltage $V_3$ (S66 in FIG. 5), and starts up the DC/DC converter 12 (S68 in FIG. 5). Accordingly, the rear stage DC link voltage $V_{dc2}$ of each of the cells increases. When the rear stage DC link voltages $V_{dc2}$ of all of the rear stage DC link voltages $V_{dc2}$ reach the predetermined voltage $V_3$, the central control circuit 103 transmits the MD4 command to all of the cell (S26, S28 in FIG. 4) at time t6. Accordingly, all of the power converter cells 10 start the normal operation at the time t6.

In FIG. 6, "STA", "STB", "STC" indicate states of the DC/DC converters 12A, 12B, and 12C, respectively. In the states STA, STB, and STC, sections indicated by hatched rectangular are sections where "self-consuming operation is executed in these DC/DC converters. Further, sections indicated by rectangles, but not hatched are sections where the "DC link operations" are executed. Sections where these rectangles are not drawn before time t6 are sections where all of the corresponding switching elements Q1 to Q4 are in OFF states.

FIG. 7 is waveform charts of the drive signals supplied to the full bridge circuit 212 (see FIG. 2) from the former stage control circuit 14.

Here, the drive signals SS1 to SS4 are drive signals supplied to the switching elements Q1 to Q4 (see FIG. 2) in periods where the "self-consuming operations are executed, respectively. Further, the drive signals SN1 to SN4 are drive signals supplied to the switching elements Q1 to Q4 upon "DC link operation" for outputting DC power from the DC/DC converter 12.

For periods where both drive signals SS1 and SS3 are "1", both the switching elements Q1, Q3 are in ON states. Further, for periods where both drive signals SS2 and SS4 are "1", both the switching elements Q2, Q4 are in ON states. The switching elements Q1 to Q4 have slight parasitic capacitances. Accordingly, when turning ON and OFF states of the switching elements Q1 to Q4 in response to the drive signals SS1 to SS4, since the parasitic capacities are charge and discharged, slight power is consumed at the full bridge circuit 212. This operation can discharge the former stage DC link capacitor 16. Further, since the former stage cell control circuit 14 can keep the former stage DC link voltage $V_{dc1}$ at the predetermined voltage $V_1$ because the power consumption can be adjusted by changing the switching frequency of the drive signal SS1 to SS4.

While the DC link operation is conducted, both the switching elements Q1 and Q4 are in ON states for a period in which both the drive signals SN1 and SN4 are "1".

Accordingly, in FIG. 2, a current flows through the switching element Q1, a resonation inductor 204, a transformer 208, and a resonation capacitor 206. Further, both the switching elements Q2 and Q3 are in ON states for a period in which both the drive signals SN2 and SN3 are "1". This results in flow of a counter current in the transformer 208, etc. Accordingly, electric power can be transferred from the DC/DC converter 12 to the power converter cell 10 by switching between the ON and OFF states of the switching elements Q1 to Q4 in response to the drive signals SN1 to SN4.

Figure 8:
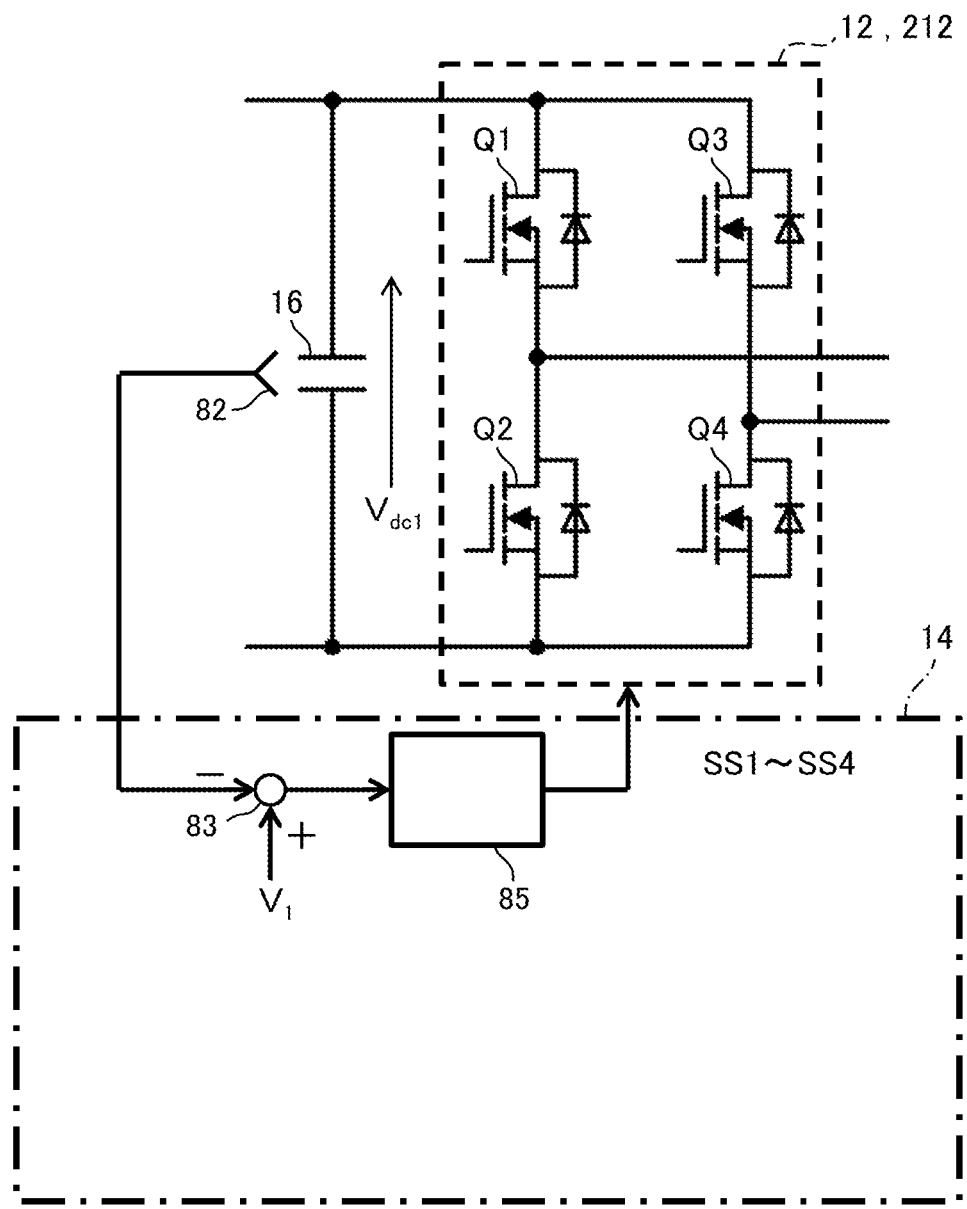
FIG. 8 is a block diagram of a main part of the former stage cell control circuit.

FIG. 8 is a block diagram of a main part of the former stage cell control circuit 14. In other words, FIG. 8 shows an algorism structure for the self-consuming operations executed by the former stage cell control circuit 14.

In FIG. 8, a voltage sensor 82 measures the former stage DC link voltage $V_{dc1}$. A subtractor 83 subtracts the former stage DC link voltage $V_{dc1}$ from the predetermined voltage $V_1$. A switching frequency calculating part 85 determines the switching frequency of the drive signals SS1 to SS4 based on the subtraction result in the subtractor 83. As described above, the power consumption in the DC/DC converter 12 can be controlled by controlling the switching frequency because the power consumed at the switching elements Q1 to Q4 relates to the switching frequency of the drive signals SS1 to SS4. For example, when the power consumption in the DC/DC converter 12 is reduced, it is better to decrease the switching frequency.

<Advantageous Effect of the First Embodiment>

As described above, the power conversion device (100) includes the control circuit (103) for effecting the charging operation of the first capacitor (16), while changing the operation state of the first converter (11) in accordance with the first DC voltage ($V_{dc1}$).

Accordingly, the first capacitor (16) can be charged in accordance with the first DC voltage ($V_{dc1}$).

More specifically, the control circuit (103) operates the second converter (12) to make the first DC voltage ($V_{dc1}$) closer to the first predetermined voltage ($V_1$).

Accordingly, in control of the first DC voltage ($V_{dc1}$), the second converter (12) can be effectively used.

Further, the control circuit (103) operates the second converter (12) to make the first DC voltage ($V_{dc1}$) closer to the first predetermined voltage ($V_1$) under a condition that the first DC voltage ($V_{dc1}$) is equal to or higher than the predetermined startup voltage ($V_0$) which is lower than the first predetermined voltage ($V_1$).

Accordingly, it is possible to adequately operate the second converter (12) in accordance with the first DC voltage ($V_{dc1}$).

Further, the second converter (12) is a converter configured to convert the first DC voltage ($V_{dc1}$) into a second DC voltage ($V_{dc2}$), the power converter cell (10) includes the second capacitor (17) charged by the second DC voltage ($V_{dc2}$), and the control circuit (103) controls the second converter (12) to charge the second capacitor (17) after the first DC voltage ($V_{dc1}$) has reached the second predetermined voltage ($V_2$).

Accordingly, it is possible to start charging the second capacitor (17) at suitable timing.

Further, upon charging the second capacitor (17) the second converter (12) controls the output current flowing through the second capacitor (17) equal to or lower than the predetermined value.

This can prevent a rush current from flowing into the second capacitor (17).

Further, upon charging the second capacitor (17) the second converter (12) controls the output current flowing into the second capacitor (17) equal to or lower than a predetermined value. After this, the second converter (12) effects controlling to make the second DC voltages ($V_{dc2}$) closer to the third predetermined voltage ($V_3$).

Accordingly, it is possible to keep the second DC voltage ($V_{dc2}$) around the third predetermined voltage ($V_3$) while the rush current is prevented from flowing into the second capacitor (17).

Further, according to the embodiment, for example, a special power source for initial charging, etc. are unnecessary. Among a plurality of the power converter cells (10), though there are differences in capacity of the first capacitors (16), it is possible to perform the initial charging in a short time interval at a low cost with prevention of over voltage of the first capacitors (16), etc. Accordingly, the power conversion device (100) according to the embodiment can be configured at a low cost with rapid initial charging.

Second Embodiment

Next, a configuration of a power conversion device according to a second embodiment will be described. In the description below, parts corresponding to the parts in the first embodiment are designated with the same reference numerals, and their detailed descriptions may be omitted.

A hardware configuration according to the second embodiment are substantially same as that of the first embodiment (see FIGS. 1, 2, 3, and 8), and a control program in the central control circuit 103 is substantially the same as that of the first embodiment (see FIG. 4).

However, the program executed by the former stage cell control circuit 14 is different from that in the first embodiment (see FIG. 5).

Figure 9:
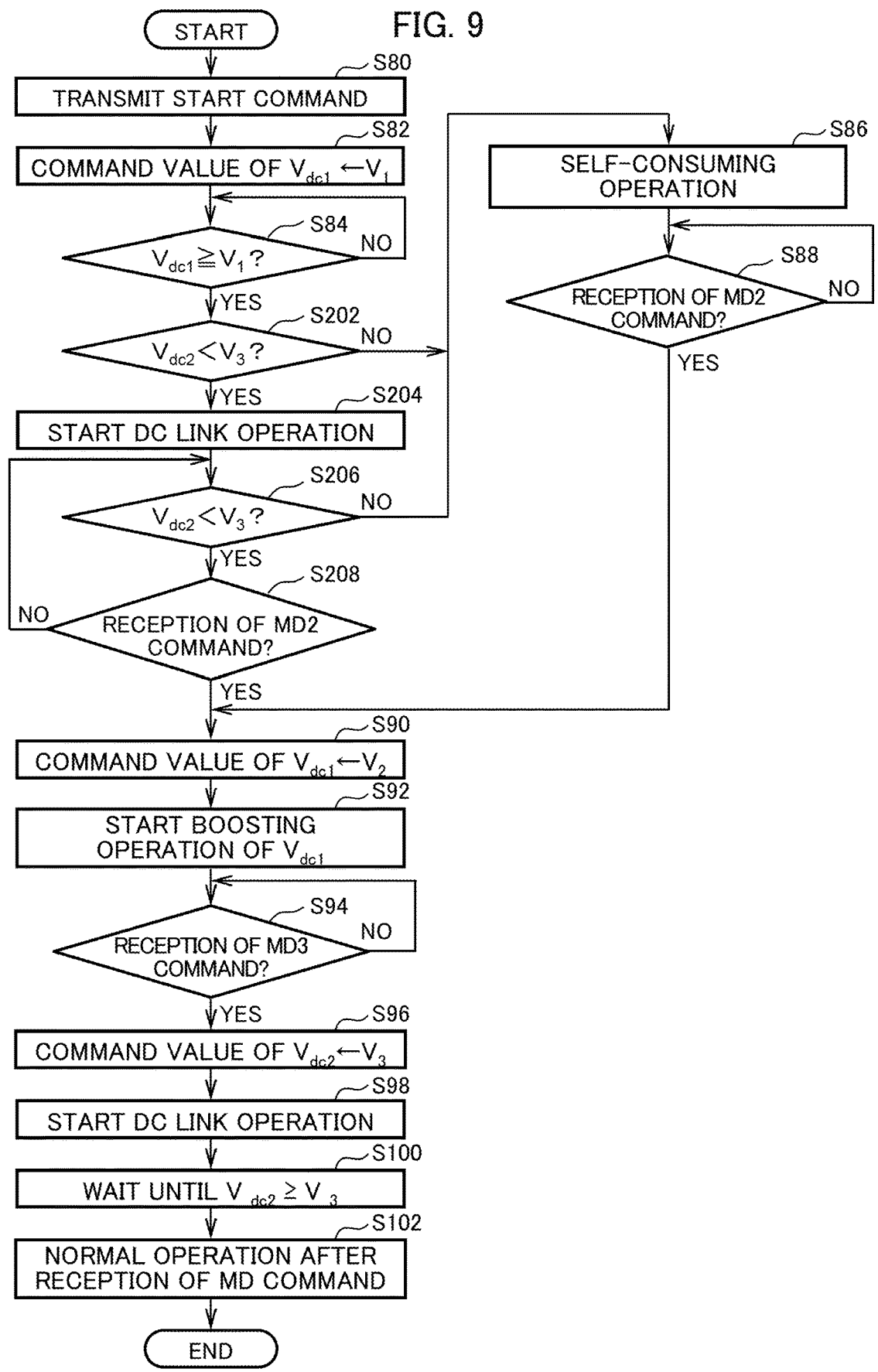
FIG. 9 is a flowchart of a control program executed by the former stage cell control circuit in a second embodiment.
Figures 10A, 10B, 10C, 10D:
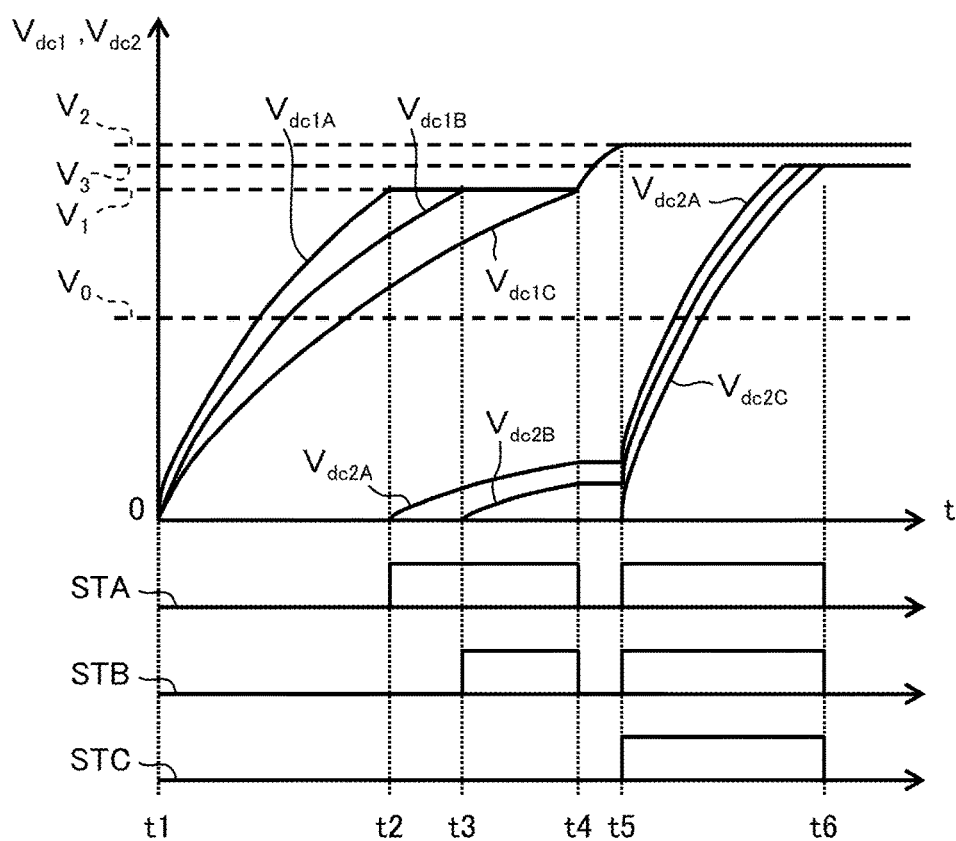
FIGS. 10A to 10D are waveform charts of the former stage DC link Voltage and the rear stage DC link voltage.

FIG. 9 is a flowchart of the control program executed by the former stage cell control circuit 14 during the initial charging according to the second embodiment.

As described above, the former stage cell control circuit 14 is in a non-startup state until the former stage DC link voltage $V_{dc1}$ reaches the control circuit startup voltage $V_0$. When the former stage DC link voltage $V_0$ reaches the control circuit startup voltage $V_0$, the former stage cell control circuit 14 starts up, and processing proceeds to a step S80 in FIG. 9. Processing at steps S80 to S84 in FIG. 9 are the same as those at the steps S50 to S54 in FIG. 5.

More specifically, the former stage cell control circuit 14 transmits a startup notification to the central control circuit 103 (S80), and then, processing executes waiting until the former stage DC link voltage $V_{dc1}$ reaches the predetermined voltage $V_1$ (S82, S84). When the former stage DC link voltage $V_{dc1}$ reaches the predetermined voltage $V_{dc1}$ (S82, S84) reaches the predetermined voltage $V_1$, processing proceeds a step S202, and it is determined whether the former state DC link voltage V dc2 is lower that the predetermined voltage $V_3$ or not. When it is determined as "Yes", processing proceeds to a step S204 and starts DC link operation. The operation of the DC link operation is similar to that of the step S68 in the first embodiment.

More specifically, the processing at the step S204 is similar to that at the step S68 in that the former stage cell control circuit 14 starts up and causes the DC/DC converter 12 to transfer electric power to the rear stage DC link capacitor 17 for charging. However, the processing at the step S204 is different from the processing at the step S68 in that an excess electric power is transferred to the rear stage DC link capacitor 17 while the former DC link voltage $V_{dc1}$ is kept at the predetermined voltage $V_1$.

When processing proceeds to a step S206, it is determined whether the rear stage DC link voltage $V_{dc2}$ is lower than the predetermined voltage V3 again. When it is determined as "Yes", processing proceeds to a step S208, and the former stage cell control circuit 14 determines whether the MD2 command has been received from the central control circuit 103 or not. When it is determined as "No", processing returns to the step S206. After this, a loop of the steps S206 and S208 is repeated until the rear stage DC link voltage $V_{dc2}$ is lower than the predetermined voltage $V_3$ and the former stage cell control circuit 14 receives the MD2 command.

When the former stage cell control circuit 14 receives the MD2 command, it is determined as "Yes" at the step S208, and processing proceeds to a step S90. After this, the processing from the step S90 to S102 are executed. These processing are the same as those at the step S60 to S72. More specifically, the former stage cell control circuit 14 sets the command value of the former stage DC link voltage $V_{dc1}$ to the predetermined voltage $V_2$ (S90) and stats the $V_{dc1}$ boosting operation (S92).

After this, the former stage cell control circuit 14 receives the MD3 command from the control circuit 103 (S94), the former stage cell control circuit 14 sets the command value of the rear stage DC link voltage $V_{dc2}$ to the predetermined voltage $V_3$ (596) and starts the DC link operation (S98). Accordingly, charging of the rear stage DC link capacitor 17 is started, so that the rear stage DC link voltage $V_{dc2}$ are increasing. When the relationship of "$V_{dc2} \geq V3$" has established (S100), the former stage cell control circuit 14 executes waiting until the normal operation mode MD4 is received from the control circuit 103, and upon reception of the MD4 command, sets the operation mode to the normal operation mode MD4 (S102), and finishes the processing of this routine.

Now, though the power conversion device 100 is stopping, there may be a case where the rear stage DC link capacitor 17 is charged in such a case that the load device 102 generates a regeneration electric power. In such the case, the rear stage DC link voltage $V_{dc2}$ reaches the predetermined voltage V3 early. Then, at the step S202 or the step S206, determination of "No" is made, and processing proceeds to a step S86.

At a step S86, similarly to the step S56 in the first embodiment, the former stage cell control circuit 14 starts "self-consuming operation". Next, when processing proceeds to a step S88, the former cell control circuit 14 determines whether the MD2 command has been received from the control circuit 103. When it is determination as "No", processing for waiting is made at the step S88. On the other hand, when the MD2 command is received, determination of "Yes" is made, and processing after the above-described step S90 is executed.

FIGS. 10A to 10D are waveform charts of the former stage DC link voltage $V_{dc1}$ and the rear stage DC link voltage $V_{dc2}$.

In FIGS. 10A to 10D, it is assumed that the initial charging starting process (the step S10 in FIG. 4) is executed by the central control circuit 103 at time t1. Similar to the case in FIG. 6, when the electrostatic capacitance magnitude relation is $C_A < C_B < C_C$, $V_{dc1A}$ reaches the predetermined voltage $V_1$ first at time t2. At the time t2, charging to the rear stage DC link capacitor 17A is stated, so that a boost of the rear stage DC link voltage $V_{dc2A}$ starts.

After this, at time t3, when the former stage DC link voltage $V_{dc1B}$ reaches the predetermined voltage $V_1$, charging the rear stage DC link capacitor 17B starts, and boosting the rear stage DC link voltage $V_{dc2B}$ starts. As described above, in the embodiment, since boosting the rear stage DC link voltages $V_{dc2A}$, $V_{dc2B}$ is started early, both the rear stage DC link voltages $V_{dc2A}$, $V_{dc2B}$ reach the predetermined voltage $V_3$ before time t6. The operation described above is similar to the operation in the first embodiment (see FIG. 6). In this embodiment, after the rear stage DC link voltages $V_{dc2A}$ and $V_{dc2B}$ reach the predetermined voltage $V_1$, the electric power inputted from the converter 11 can be effectively used to boost the rear stage DC link voltage $V_{dc2A}$ and $V_{dc2B}$. Accordingly, the initial charging the rear stage DC link capacitor 17 is provided at a higher efficient and in a shorter time interval than the first embodiment.

As described above, similarly to the first embodiment, the power conversion device according to the second embodiment can be configured at a low cost with an advantageous effect including rapid initial charging, etc.

Further, according to the second embodiment, upon charging the second capacitor (17), while the second converter (12) operates so as to make the first DC voltage ($V_{dc1}$) closer to the first predetermined voltage ($V_1$), the second converter (12) charges the second capacitor (17) and after this, charges the second capacitor (17) based on the current flowing through the second capacitor (17) or the second DC voltage ($V_{dc2}$).

Accordingly, since it is possible to start charging the rear stage DC link capacitor 17, which is at least a part of capacitors before reach of the former DC link voltage $V_{dc1}$ to the predetermined voltage V2, it is possible to shorten the initial charging time interval of the power conversion device and to increase the power conversion efficiency during the initial charging.

Third Embodiment

Next, a configuration of the power conversion device according to a third embodiment of the present invention will be described. In the description below, parts corresponding to parts in the other embodiments described above are designated with the same reference numerals, and their detailed descriptions may be omitted.

Figure 11:
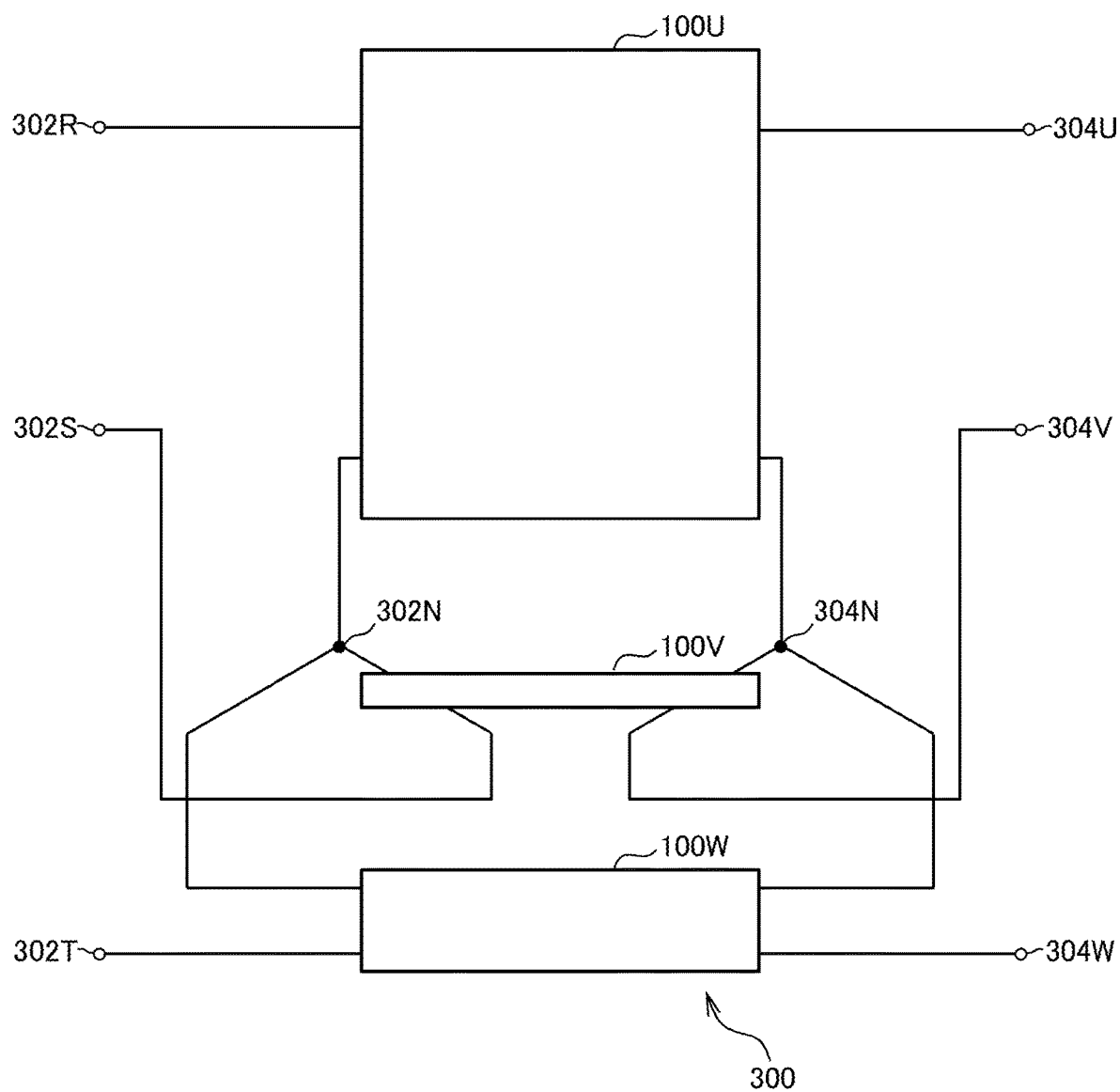
FIG. 11 is a system block diagram of a power conversion system according to a third embodiment.

FIG. 11 is a block diagram of the power conversion system 300 according to the third embodiment.

The power conversion system 300 includes input terminals 302R, 302S, 302T, output terminals 304U, 304V, 304W, and power conversion devices 100U, 100V, and 100W. The power conversion devices 100U, 100V, and 100W are similarly configured to those in the power conversion device 100 in the first embodiment (see FIG. 1), or the power conversion device according to the second embodiment.

The input terminals 302R, 302S, and 302T are supplied with an R-phase voltage, an S-phase voltage, and a T-phase voltage of the three-phase grid power source. One input terminals of the power conversion devices 100U, 100V, and 100W are connected to the input terminals 302R, 302S, and 302T, respectively, and other input terminals are connected to a grid-side neutral point 302N. Further, output terminals 304U, 304V, and 304W are connoted to un-shown three-phase load device. One output terminals of the power conversion devices 100U, 100V, and 100W are connected to output terminals 304U, 304V, and 304W, respectively. Other output terminals are connected to a load-side neutral point 304N.

According to this configuration, the power conversion system 300 converts the three-phase AC power supplied to the input terminals 302R, 302S, and 302T into other three-phase AC power having a given voltage amplitude and a given frequency to supply it to a un-shown three-phase load device. In this embodiment, the power conversion devices 100U, 100V, and 100W execute independently the initial charging operation similar to those in the first or second embodiment.

As described above, according to the embodiment, also in the three-phase power conversion system 300, it is possible to configure the device with rapid initial charge.

Modifications

The present invention is not limited to the above-described embodiments, and various modifications are pos-sible. Further, it is possible to replace a configuration of other embodiment with a part of the configuration of the other embodiment, and to add a configuration of other embodiment to a configuration of one embodiment. Also, it is possible to delete a part of each of the embodiments and and/or add or replace another configuration. Further, regarding the control lines and data lines shown in the drawings, only control lines and data lines necessary for description are shown, and not all control lines and data lines necessary for products are shown. Actually, all most all configurations are connected mutually. Possible modification of the embodiments described above are as follows:

(1) in each of the above-described embodiments, the number of the power converter cells included in the power conversion device 100 (see FIG. 1). However, this is only an example. The number of the power converter cells can be determined arbitrary. Further, in FIG. 1, output terminals of respective power converter cells 10A, 10B, and 10C are connected in series. However, these output terminals may be connected in parallel.

(2) In the power converter cell 10 shown in FIG. 2, various modifications are possible. For example, in the DC/DC converter 1, only one of the resonation inductors 204 and 205 is equipped. Another configuration can be adopted in which power conversion is effected without current resonation with the resonation capacitor 206 omitted. Further, it is possible to apply a full bridge circuit using switching elements in place of the diode bridge circuit 214.

(3) In FIGS. 1, 2, and 8, examples using MOSFETs are used as switching elements. However, it is possible to apply other elements such as IGBT (Insulated Gate Bipolar Transistor, etc.

(4) Patterns of the drive signals SS1 to SS4 shown in FIG. 7 are unlimited to the shown patterns. For example, only one of the drive signals SS1 and SS3 is alternately switched and the other one may be kept "0". Similarly, on only one of the drive signals SS2 and SS4 is alternately switched and the other one may be kept "0".

(5) In the above-described third embodiment (see FIG. 11), between the input terminals 302R, 302S, 302T and output terminals 304U, 304V, 304W, the power conversion devices 100U, 100V, and 100W are connected in Y-Y connection. However, the connection method of the power conversion devices 100U, 100V, 100W is not limited to the Y-Y connection, but may be a Y-Δ connection, a Δ-Y connection Δ, or a Δ-Δ connection.

(6) Since hardware of the central control circuit 103, the former stage cell control circuit 14, and the rear stage cell control circuit 15 are provided with a general computer, programs, etc. shown in FIGS. 4, 5, and 9 may be distributed with a storing medium, etc., which the programs, etc. are stored or through a transmission line.

(7) The processes shown in FIGS. 4, 5, 9 are described as processing as software using programs. However, a part or all of them are replaced with hardware process using an ASIC (Application Specific Integrated Circuit; an IC for specified use), or FPGA (field-programmable gate array).

DESCRIPTION OF REFERENCE SYMBOLS 10, 10A, 10B, 10C power converter cell
11, 11A, 11B, 11C converters (first converter)
12, 12A, 12B, 12C DC/DC converter (second converter)
16, 16A, 16B, 16C former stage DC link capacitor (first capacitor)
17, 17A, 17B, 17C rear stage DC link capacitor (second capacitor)

100, 100U, 100V, 100W power conversion device
103 central control circuit (control circuit)
1 first predetermined voltage
2 second predetermined voltage
3 third predetermined voltage
$V_{dc1}$ former stage DC link voltage (first DC voltage)
$V_{dc2}$ rear stage DC link voltage (second DC voltage)

The invention claimed is:

1. A power conversion device comprising:
a power converter cell including:
a first converter configured to convert a first AC voltage into a first DC voltage;
a second converter configured to convert the first DC voltage into another voltage; and
a first capacitor charged using the first DC voltage; and
a control circuit configured to effect, while changing the operation state of the first converter in accordance with the first DC voltage, charging the first capacitor;
wherein the control circuit operates the second converter to make the first DC voltage closer to a first predetermined voltage; and
wherein the control circuit operates the second converter to make the first DC voltage closer to the first predetermined voltage under a condition that the first DC voltage is equal to or higher than a predetermined startup voltage lower than the first predetermined voltage.

2. A power conversion device comprising:
a power converter cell including:
a first converter configured to convert a first AC voltage into a first DC voltage;
a second converter configured to convert the first DC voltage into another voltage; and
a first capacitor charged using the first DC voltage; and
a control circuit configured to effect, while changing the operation state of the first converter in accordance with the first DC voltage, charging the first capacitor;
wherein the second converter is a converter configured to convert the first DC voltage into a second DC voltage; and
wherein the power converter cell includes a second capacitor charged with the second DC voltage, the control circuit controls the second converter to charge the second capacitor after the first DC voltage has reached a second predetermined voltage.

3. The power conversion device as claimed in claim 2, wherein the second converter controls an output current to make a current flowing through the second capacitor equal to or lower than the a predetermined value when the second capacitor is charged.

4. The power conversion device as claimed in claim 3, wherein the second converter controls an output current to make a current flowing through the second capacitor equal to or lower than a predetermined value and then, control to make the second DC voltage closer to a third predetermined voltage.

5. The power conversion device as claimed in claim 2, wherein when charging the second capacitor, the second converter charges the second capacitor, while the second converter operates to make the first DC voltage closer to the first predetermined voltage, and then, charges the second capacitor based on the current flowing through the second capacitor or the second DC voltage.

* * * * *